US005508771A

United States Patent [19]
Stephenson, III

[11] Patent Number: 5,508,771
[45] Date of Patent: Apr. 16, 1996

[54] APPARATUS AND METHOD FOR STOPPING FILM ADVANCE

[75] Inventor: Stanley W. Stephenson, III, Spencerport, N.Y.

[73] Assignee: Eastman Kodak Company, Rochester, N.Y.

[21] Appl. No.: 370,064

[22] Filed: Jan. 9, 1995

[51] Int. Cl.⁶ .................................................. G03B 1/00
[52] U.S. Cl. ............................................................ 354/213
[58] Field of Search ...................................... 354/213, 215

[56] References Cited

U.S. PATENT DOCUMENTS 3,688,668  9/1972  Ort .
4,914,462  4/1990  Pagano .
5,008,692  4/1991  Diehl et al. .

Primary Examiner—Monroe H. Hayes
Attorney, Agent, or Firm—Peter J. Bilinski

[57] ABSTRACT

An apparatus for stopping photographic film advance upon encountering an end-of-roll perforation at the end of a roll of film. In one embodiment, the apparatus includes a camera body defining a film track for slidably receiving film, a camming member movably positioned adjacent the film track and including an engaging finger, and a load spring. The load spring positions the engaging finger in a first position out of the film track when film is absent from the film track, and further biases the engaging finger into a second position into engagement with film in the film track. The engaging finger is designed to move to a third position, via force form the load spring, into an aligned end-of-roll perforation in the film to inhibit film advancement.

18 Claims, 2 Drawing Sheets

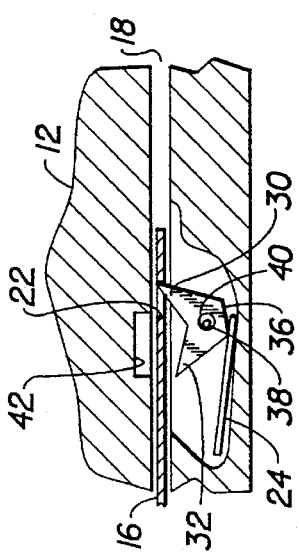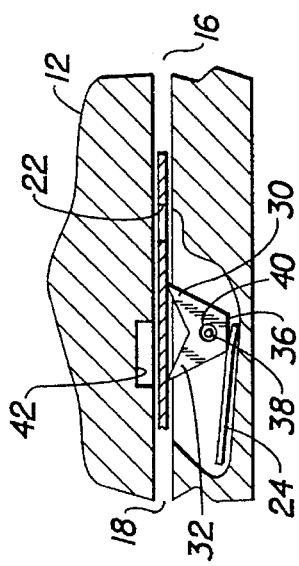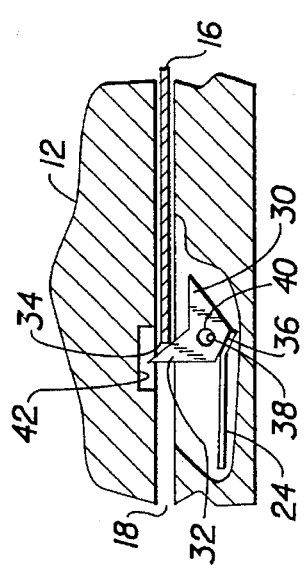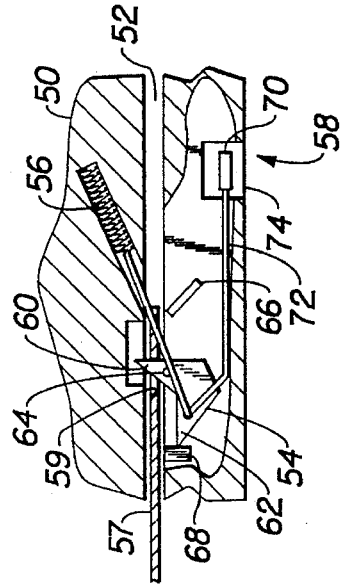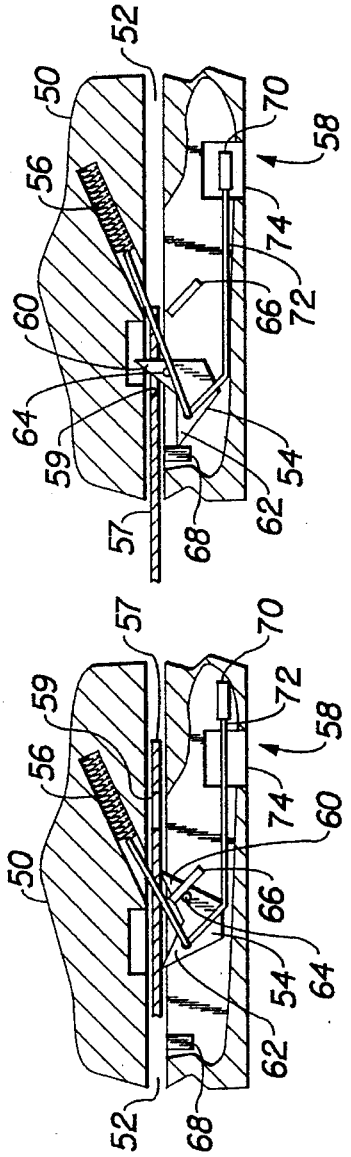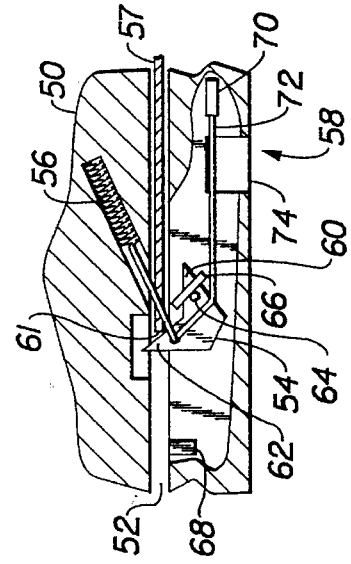

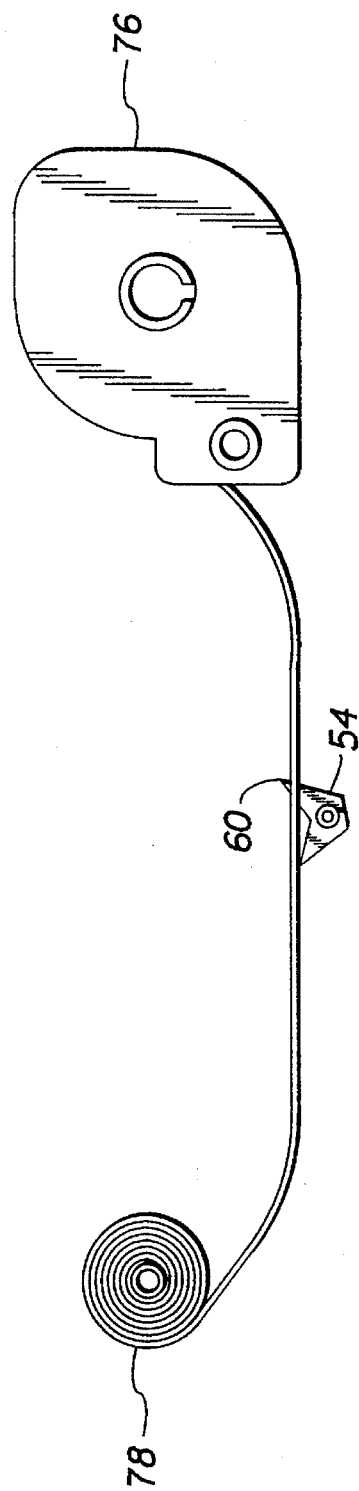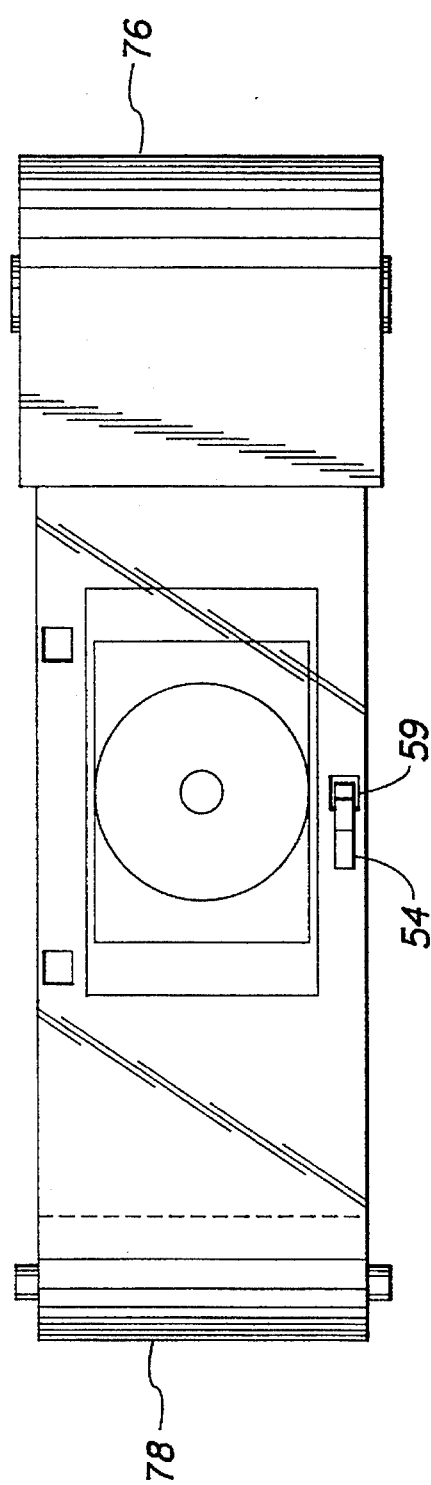

APPARATUS AND METHOD FOR STOPPING FILM ADVANCE

FIELD OF THE INVENTION

The present invention generally relates to the field of photographic cameras and, more specifically, to mechanisms for stopping the advance of film when the end of the film has been reached.

BACKGROUND OF THE INVENTION

In conventional film cartridges, one end of photographic film is secured to a film spool, and the film is wrapped around the spool. In use, the cartridge is loaded into a photographic camera and the film is unrolled from the spool frame by frame and rolled onto a take-up spool, as is generally known in the art. During each frame advancement of the film, a high-energy lever in the camera is reset. The high energy lever is released by the shutter button and provides the energy for moving the camera shutter during exposure of the film.

When the last frame is exposed and the film is subsequently advanced, movement of the film will eventually be inhibited due to the securement of the end of the film to the spool. In automatic winding cameras, this condition typically will be sensed by a torque-limited drive mechanism, and the camera will be instructed either to stop winding the film or to go into rewind mode to rewind the film onto the cartridge spool. In manually operated cameras, the end of roll condition will be sensed by the user due to an increase in winding force.

One problem that may arise in the operation of a camera is that the high energy lever may become reset before or simultaneous with reaching the end of the film. In this situation, if the shutter button is pressed during rewind of the camera, the high energy lever will be released, and the film that is positioned behind the shutter will become exposed, thereby resulting in a double exposure.

In addition, due to a wide range of user strength and varying degrees of user knowledge regarding camera operation, sometimes the user will continue to wind the film after the end of film has been reached, resulting in the end of the film becoming detached from the spool. Such a condition is undesirable because the film typically is not salvageable without special processing.

Accordingly, it would be desirable to provide a mechanism, other than the attached interface between the film and the spool, for stopping film advance when the end of a roll of film has been reached. This mechanism would advantageously be activated before stress was placed on the interface between the film and the roll. In addition, when used in conjunction with metering perforations, such a mechanism should stop the film before the high energy lever of the camera is reset.

SUMMARY OF THE INVENTION

In accordance with the present invention, an apparatus is provided for stopping photographic film advance upon encountering a perforation (e.g., an end-of-roll perforation at the end of a roll of film). The apparatus includes a camera body defining a film track for slidably receiving film, a camming member movably positioned adjacent the film track and including an engaging finger, positioning means (e.g., a load spring) for positioning the engaging finger in a first position out of the film track when film is absent from the film track, sensing means (e.g., a sensing finger extending from the camming member) integral with the camming member for sensing the presence of film in the film track and for moving the engaging finger to a second position into engagement with the film, and a biasing device (e.g., a load spring) for biasing the engaging finger into engagement with film in the film track. The apparatus is designed such that the engaging finger will move to a third position into an aligned perforation in the film to inhibit film advancement.

In one embodiment, the apparatus further includes an indicating device for indicating that the engaging finger has stopped film advance. For example, the indicating device may include an indicator operatively connected to the camming member and movable from a hidden position to a visible position. In such an embodiment, the camming member may be movably positioned within the camera body to allow for movement of the camming member relative to the camera body to a fourth position laterally displaced from the third position. The movement from the third position to the fourth position corresponds with movement of the indicator from the hidden position to the visible position.

The camera body may further include a pivot pin positioned within an aperture in the camming member, the pivot pin having a diameter less than a diameter of the aperture. In yet another embodiment, the camera body includes a camming surface for selectively engaging a follower pin secured to the camming member.

In another aspect of the present invention, a method for stopping photographic film advance in a camera is provided. The method is particularly applicable to cameras having a camera body defining a film track, the film track being designed to receive film having an end-of-roll perforation. The method generally includes the steps of positioning a camming member such that an engaging finger of the camming member is positioned out of the film track, advancing the film through the film track, aligning the end-of-roll perforation with the engaging finger, and inserting the engaging finger into the end-of-roll perforation to thereby inhibit film advance.

In one embodiment, the step of positioning further includes positioning a sensing finger of the camming member in the film track. In addition, the method may further include, after the advancing step, the steps of engaging the sensing finger with a leading edge of the film, and moving the camming member such that the sensing finger is out of the film track and such that the engaging finger is in biased engagement with the film.

In another embodiment, the method further includes providing visual indication to a user of the camera that the end of the film roll has been reached. For example, the step of providing visual indication may include laterally moving an indicator from a hidden position to a visible position. In one specific embodiment, the indicator is operatively connected to the camming member, and the step of laterally moving the indicator includes laterally moving the camming member.

In yet another aspect, the present invention is embodied in an apparatus for stopping photographic film advance upon encountering an end-of-roll perforation at the end of a roll of film. The apparatus generally includes a camera body defining a film track for slidably receiving film, a camming member movably positioned adjacent the film track and including a sensing finger and an engaging finger, and a load spring operatively connected to the camming member. The camming member is movable from a first position to a second position to a third position. The first position corresponds with the sensing finger positioned in the film track and the engaging finger positioned out of the film track, the second position corresponds with both the sensing finger and the engaging finger being engaged with film positioned in the film track, and the third position corresponds with the engaging finger positioned within the end-of-roll perforation in the film. The load spring is designed to bias the camming member into the first position when film is absent from the film track, to force the camming member into the second position into biased engagement with film present in the film track, and to force the camming member into the third position upon encountering the end-of-roll perforation.

BRIEF DESCRIPTION OF THE DRAWINGS

FIG. 1 illustrates one embodiment of the present invention, with a camming member in a first position prior to complete insertion of film into a film track.

FIG. 2 illustrates the embodiment of FIG. 1 with the camming member in a second position after insertion of film into the film track.

FIG. 3 illustrates the embodiment of FIG. 1 with the camming member in a third position after an engaging finger of the camming body has encountered a perforation in the film.

FIG. 4 illustrates an alternative embodiment of the present invention, with a camming member in a first position prior to complete insertion of film into a film track.

FIG. 5 illustrates the embodiment of FIG. 4 with the camming member in a second position after insertion of film into the film track.

FIG. 6 illustrates the embodiment of FIG. 4 with the camming member in a third position after an engaging finger of the camming body has encountered a perforation in the film.

FIG. 7 is a top schematic view of a film cartridge, take-up spool, film and camming member embodying the present invention.

FIG. 8 is a back schematic view of the assembly shown in FIG. 7.

DETAILED DESCRIPTION

One embodiment of the present invention is shown in the apparatus 10 illustrated in FIGS. 1–3. The apparatus 10 includes a camera body 12 for receiving a film cartridge and allowing for the passage of film 16 through a film track 18 defined in the camera body 12. A camming member 20 is movably positioned adjacent the film track 18 and is designed to engage an end-of-roll perforation 22 in the film 16. A load spring 24 is provided to bias the camming member 20 into various positions depending on the positioning of the film 16. As described below in more detail, each of the components of the apparatus 10 illustrated in FIGS. 1–3 are operatively associated with each other to provide a mechanism for stopping film advance when an end-of-roll perforation 22 is encountered.

The camera body 12 of the illustrated embodiment could comprise any appropriate camera body 12 wherein film 16 is loaded and sequentially advanced to expose frames on the film 16. In the illustrated embodiment, the camera body 12 comprises a manually-wound camera including a cartridge compartment for receiving a film cartridge therein, a film track 18 for guiding the film 16 from the film cartridge, and a take-up spool for engaging and providing advancement of the film 16.

The camming member 20 of the present invention includes an engaging finger 30 and is movable between at least three different positions. In the first position, the engaging finger 30 is positioned out of the film track 18 such that it does not interfere with movement of the film 16 therethrough, as illustrated in FIG. 1. Such first position generally corresponds with the absence of film 16 in the film track 18. Once film 16 is appropriately positioned in the film track 18, the engaging finger 30 is moved to a second position where the engaging finger 30 is compliantly engaged with the film 16 (e.g., on one edge of the film, out of the exposure area of the film), as shown in FIG. 2. When the engaging finger 30 encounters the end-of-roll perforation 22, the engaging finger 30 is inserted therein to a third position, shown in FIG. 3, thereby inhibiting advance of the film 16.

In order to accomplish the above-described motion of the engaging finger 30, the camming member 20 includes a sensing finger 32 which is positioned in the film track 18 when the camming member 20 is in the first position. Upon insertion of the film 16 through the film track 18, the leading edge 34 of the film 16 engages the sensing finger 32 and moves the camming body from the first position (FIG. 1) to the second position (FIG. 2) with both the sensing finger 32 and the engaging finger 30 in biased engagement with the film 16. When the end-of-roll perforation 22 becomes aligned with the engaging finger 30, the engaging finger 30 will automatically be thrust into the perforation 22 due to its compliant engagement with the film 16 (FIG. 3).

The load spring 24 of the present invention is operatively associated with the camming body such that the load spring 24 biases the camming body toward to the first position when film 16 is absent from the film track 18. In the illustrated embodiment, the load spring 24 comprises a cantilevered leaf-type spring which, when film 16 is absent from the film track 18, engages a flat portion 36 of the camming member 20 to position the camming member 20 in the first position (FIG. 1). Upon insertion of film 16 through the film track 18, the camming member 20 is moved to the second position (FIG. 2) and the load spring 24 provides force to the camming member 20 such that both the sensing finger 32 and the engaging finger 30 are in biased engagement with the film 16. In order to facilitate such biased engagement, the camera body 12 includes a pivot pin 38 positioned within an aperture 40 in the camming member 20. As can be seen in the drawings, the pivot pin 38 is significantly smaller in diameter than the aperture 40, thereby providing for some play between the pivot pin 38 and the camming member 20. Such play allows for the biased engagement of the camming member 20 with the film 16. Other means for providing biased engagement could also be utilized. For example, the film itself (i.e., the outer edge of the film) could be compliantly mounted in the film track 18 to provide a force against the camming member 20. Regardless of the means for providing biased engagement, when the end-of-roll perforation 22 becomes aligned with the engaging finger 30, the engaging finger 30 will be forced into the perforation 22 due to the biased force (FIG. 3).

The apparatus 10 further includes a pawl relief 42 formed into the camera body 12 on the opposite side of the film track 18 from the camming member 20. The pawl relief 42 is designed to allow the sensing finger 32 of the camming member 20 to be positioned completely across the film track 18 so that, when film 16 is inserted into the film track 18, there is significant rotation of the camming member 20 to properly position the camming member 20 in the second position. Without such a pawl relief 42, there is the potential that the film 16 may pass beyond the sensing finger 32 without adequately rotating the camming member 20 to the second position.

An alternative embodiment of the present invention is illustrated in FIGS. 4–6. Similar to the previous embodiment, the illustrated apparatus includes a camera body 50 defining a film track 52, a camming member 54 movably positioned adjacent to the film track 52, and a load spring 56 to bias the camming member 54 into various positions depending on the position of the film 57. The alternative apparatus further includes an indicating means 58, the function of which will be described below in more detail.

The camming member 54 of the alternative embodiment includes both an engaging finger 60 and a sensing finger 62, similar to the previously-described embodiment. However, in contrast to the previous embodiment, the camming member 54 is slidably positioned within the camera body 50 to allow significant lateral movement thereof. More specifically, in its first position (FIG. 4), a follower pin 64 secured to the camming member 54 is engaged with an angled cam surface 66 secured to the camera body 50 to position the engaging finger 60 out of the film track 52 and the sensing finger 62 in the film track 52. The camming member 54 is biased in the first position by the load spring 56, described below in more detail.

When film 57 is inserted into the film track 52, the leading edge 61 of the film 57 engages the sensing finger 62 and moves the camming member 54 to the second position (FIG. 5), wherein both the sensing finger 62 and the engaging finger 60 are in biased engagement with the film 57. When the end-of-roll perforation 59 is encountered, the camming member 54 is moved to the third position with the engaging finger 60 inserted into the perforation 59. Finally, the camming member 54 is laterally moved to the left to a fourth position (FIG. 6), due to advancement of the film 57, until the camming member 54 contacts a stop member 68 secured to the camera body 50.

The load spring 56 of the alternative embodiment is designed to constantly apply a force to the camming member 54 to bias the camming member 54 at an angle toward the film 57 and toward the film supply spool. In the illustrated embodiment, the load spring 56 comprises a tensile spring secured on one end to the camera body 50 and on the other end to the camming member 54. Utilizing such an arrangement, it can be seen that the load spring 56 will bias the camming member 54 in the first position when no film 57 is present in the film track 52, as illustrated in FIG. 4. In addition, it can be seen that the load spring 56 will provide the force necessary to maintain the sensing finger 62 and the engaging finger 60 in biased engagement with the film 57 when the camming member 54 is in the second position, as illustrated in FIG. 5. Further, after the camming member 54 stops film advance and the film 57 is subsequently rewound, the load spring 56 provides the necessary biasing force to pull the camming member 54 back to the first position.

The alternative embodiment further includes an indicating means 58 for indicating that the engaging finger 60 has stopped film advance. In the illustrated embodiment, the indicating means 58 comprises an indicator 70 operatively connected to the camming member 54 by a connecting member 72. The indicator 70 is movable from a hidden position, as illustrated in FIGS. 4 and 5, to a visible position, as illustrated in FIG. 6. In the visible position, the indicator 70 is visible from the rear of the camera body 50 through an indicator window 74. The indicator 70 may include text or a brightly colored area which clearly indicates that the end of the film roll has been reached.

The preferred relationship between the camming member 54 and the camera body 50 is schematically illustrated in FIGS. 7 & 8. FIG. 7 illustrates a top view of a film cartridge 76 and take-up spool 78 with film extending therebetween. The camming member 54 is positioned approximately halfway between the film cartridge 76 and the take-up spool 78 on a backside of the film. When the last frame of film is advanced into alignment with the exposure area of the camera, the end-of-roll perforation 59 will become aligned with the camming member 54 and the engaging finger 60 will be inserted therein. Further advancement of the film is thus inhibited, thereby preventing excessive stress on the interconnection between the film and the cartridge spool, and also preventing the high energy lever (not shown) from becoming reset (i.e., because the film is substantially prevented from advancing after exposure of the last frame). It should be appreciated, of course, that the positioning of the camming member 54 and end-of-roll perforation 59 could be modified without detracting from the beneficial features of the present invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

| REFERENCE NUMERAL LIST | |
|---|---|
| Numeral | Description |
| 10 | Apparatus |
| 12 | Camera Body |
| 16 | Film |
| 18 | Film Track |
| 20 | Camming Member |
| 22 | End of Roll Perforation |
| 24 | Load Spring |
| 30 | Engaging Finger |
| 32 | Sensing Finger |
| 34 | Leading edge of Film |
| 36 | Flat Portion |
| 38 | Pivot Pin |
| 40 | Aperture |
| 42 | Pawl Relief |
| 50 | Camera Body |
| 52 | Film Track |
| 54 | Camming Member |
| 56 | Load Spring |
| 57 | Film |
| 58 | Indicating Means |
| 59 | Perforation |
| 60 | Engaging Finger |
| 61 | Leading Edge |
| 62 | Sensing Finger |
| 64 | Follower Film |
| 66 | Cam Surface |
| 68 | Stop Member |
| 70 | Indicator |
| 72 | Connecting Member |
| 74 | Window |
| 76 | Cartridge |

REFERENCE NUMERAL LIST

| Numeral | Description |
| --- | --- |
| 78 | Take-up Spool |

What is claimed is:

1. An apparatus for stopping photographic film advance upon encountering an end-of-roll perforation at the end of a roll of film, said apparatus comprising:
   (a) a camera body defining a film track for slidably receiving film;
   (b) a camming member movably positioned adjacent said film track and including an engaging finger;
   (c) positioning means for positioning said engaging finger in a first position out of said film track when film is absent from said film track;
   (d) sensing means, integral with said camming member, for sensing the presence of film in said film track and for moving said engaging finger to a second position into engagement with the film; and
   (e) biasing means for biasing said engaging finger into engagement with film in said film track, whereby said engaging finger will move to a third position into an aligned end-of-roll perforation in the film to inhibit film advancement.

2. An apparatus, as claimed in claim 1, further comprising indicating means for indicating that said engaging finger has stopped film advance.

3. An apparatus, as claimed in claim 2, wherein said indicating means comprises an indicator operatively connected to said camming member and movable from a first position to a second position.

4. An apparatus, as claimed in claim 3, wherein said camming member is movably positioned within said camera body to allow for movement of said camming member relative to said camera body to a fourth position laterally displaced from said third position, said movement from said third position to said fourth position corresponding with movement of said indicator from said first position to said second position.

5. An apparatus, as claimed in claim 1, wherein said camera body includes a pivot pin positioned within an aperture in said camming member, said pivot pin having a diameter less than a diameter of said aperture.

6. An apparatus, as claimed in claim 1, wherein said camera body includes a camming surface for selectively engaging a follower pin secured to said camming member.

7. An apparatus, as claimed in claim 1, wherein said positioning means comprises a load spring.

8. An apparatus, as claimed in claim 1, wherein said sensing means comprises a sensing finger extending from said camming member.

9. An apparatus, as claimed in claim 1, wherein said biasing means comprises a load spring.

10. A method for stopping photographic film advance in a camera having a camera body defining a film track, the film track being designed to receive film having an end-of-roll perforation, said method comprising the steps of:
    (a) positioning a camming member such that an engaging finger of the camming member is positioned out of the film track;
    (b) advancing the film through the film track;
    (c) aligning the end-of-roll perforation with the engaging finger; and
    (d) inserting the engaging finger into the end-of-roll perforation to thereby inhibit film advance.

11. A method, as claimed in claim 10, wherein said step of positioning further includes positioning a sensing finger of the camming member in the film track.

12. A method, as claimed in claim 11, further comprising, after said advancing step, the steps of:
    engaging the sensing finger with a leading edge of the film; and
    moving the camming member such that the sensing finger is out of the film track and such that the engaging finger is in biased engagement with the film.

13. A method, as claimed in claim 10, further comprising providing visual indication to a user of the camera that the end of the film roll has been reached.

14. A method, as claimed in claim 13, wherein said step of providing visual indication includes laterally moving an indicator from a hidden position to a visible position.

15. A method, as claimed in claim 14, wherein the indicator is operatively connected to the camming member, and wherein said step of laterally moving the indicator includes laterally moving the camming member.

16. A method, as claimed in claim 10, further comprising the steps of:
    rewinding the film; and
    withdrawing the engaging finger from the end-of-roll perforation.

17. An apparatus for stopping photographic film advance upon encountering an end-of-roll perforation at the end of a roll of film, said apparatus comprising:
    (a) a camera body defining a film track for slidably receiving film;
    (b) a camming member movably positioned adjacent said film track and including a sensing finger and an engaging finger, said casing member being movable from a first position to a second position to a third position, said first position corresponding with said sensing finger positioned in said film track and said engaging finger positioned out of said film track, said second position corresponding with both said sensing finger and said engaging finger being engaged with film positioned in said film track, said third position corresponding with said engaging finger positioned within the end-of-roll perforation in the film; and
    (c) a load spring operatively connected to said camming member to bias said camming member into said first position when film is absent from said film track, to bias said camming member into said second position to compliantly engage film present in said film track, and to bias said camming member into said third position upon encountering the end-of-roll perforation.

18. An apparatus, as claimed in claim 17, further including an indicator operatively interconnected with said camming member and movable between a first and second positions.

* * * * *

UNITED STATES PATENT AND TRADEMARK OFFICE
CERTIFICATE OF CORRECTION

PATENT NO. : 5,508,771
DATED : April 16, 1996
INVENTOR(S) : Stanley W. Stephenson, III It is certified that error appears in the above-indentified patent and that said Letters Patent is hereby corrected as shown below:

Column 8, line 41, after "said" delete "casing" and insert --camming--

Signed and Sealed this

Fifteenth Day of October, 1996

*Attest:*

BRUCE LEHMAN

*Attesting Officer*  *Commissioner of Patents and Trademarks*